US009116985B2

(12) United States Patent
Mills et al.

(10) Patent No.: US 9,116,985 B2
(45) Date of Patent: Aug. 25, 2015

(54) COMPUTER-IMPLEMENTED SYSTEMS AND METHODS FOR TAXONOMY DEVELOPMENT

(75) Inventors: Bruce Monroe Mills, Cary, NC (US); John Courtney Haws, Durham, NC (US); John Clare Brocklebank, Raleigh, NC (US); Thomas Robert Lehman, Holly Springs, NC (US)

(73) Assignee: SAS Institute Inc., Cary, NC (US)

( * ) Notice: Subject to any disclaimer, the term of this patent is extended or adjusted under 35 U.S.C. 154(b) by 725 days.

(21) Appl. No.: 13/327,949

(22) Filed: Dec. 16, 2011

(65) Prior Publication Data
US 2013/0159348 A1 Jun. 20, 2013

(51) Int. Cl.
*G06F 17/30* (2006.01)

(52) U.S. Cl.
CPC .... *G06F 17/30731* (2013.01); *G06F 17/30705* (2013.01)

(58) Field of Classification Search
None
See application file for complete search history.

(56) References Cited

U.S. PATENT DOCUMENTS

| 6,665,681 | B1 * | 12/2003 | Vogel | 707/738 |
| 2005/0091038 | A1 * | 4/2005 | Yi et al. | 704/10 |
| 2006/0155751 | A1 * | 7/2006 | Geshwind et al. | 707/102 |
| 2007/0100779 | A1 * | 5/2007 | Levy et al. | 705/500 |
| 2008/0215571 | A1 * | 9/2008 | Huang et al. | 707/5 |
| 2009/0216524 | A1 * | 8/2009 | Skubacz et al. | 704/9 |
| 2010/0161527 | A1 | 6/2010 | Sellamanickam et al. | |
| 2010/0262454 | A1 * | 10/2010 | Sommer et al. | 705/10 |
| 2011/0040767 | A1 | 2/2011 | Kunjithapatham et al. | |
| 2011/0258049 | A1 * | 10/2011 | Ramer et al. | 705/14.66 |
| 2012/0101808 | A1 * | 4/2012 | Duong-Van | 704/9 |
| 2012/0323627 | A1 * | 12/2012 | Herring et al. | 705/7.29 |
| 2013/0103386 | A1 * | 4/2013 | Zhang et al. | 704/9 |

OTHER PUBLICATIONS

Mining and Summarizing Customer Reviews Minqing Hu KDD'04, Aug. 22-25, 2004, pp. 168-177.*
Deepak et al "Building Clusters of Related Words: An Unsupervised Approach", Proceedings of the 9th Pacific Rim International Conference on Artificial Intelligence, pp. 474-483, 2006.*
SAS Enterprise Miner and SAS Text Miner Procedures Reference for SAS 9.1.3 The DMVQ Procedure (Book Excerpt), SAS Institute Inc., Cary, NC., 2008.
SAS Taxonomy Automation, SAS Institute Inc. Cary, NC., 2011.
(Continued)

*Primary Examiner* — Robert Beausoliel, Jr.
*Assistant Examiner* — Susan F Rayyan
(74) *Attorney, Agent, or Firm* — Kilpatrick Townsend & Stockton LLP

(57) ABSTRACT

Systems and methods are provided for generating a set of classifiers. A location is determined for each instance of a topic term in a collection of documents. One or more topic term phrases are identified, and one or more sentiment terms within each topic term phrase. Candidate classifiers are identified by parsing words in the one or more topic term phrases, and a colocation matrix is generated. A seed row of the colocation associated with a particular attribute is identified, and distance metrics are determined by comparing each row of the colocation matrix to the seed row. A set of classifiers are generated for the particular attribute, where classifiers in the set of classifiers are selected using the distance metrics.

69 Claims, 17 Drawing Sheets

(56) References Cited

OTHER PUBLICATIONS

Taboada, et al., "Genre-Based Paragraph Classification for Sentiment Analysis", Proceedings of SIGDIAL 2009: the 10 Annual Meeting of the Special Interest Group in Discourse and Dialogue, Queen Mary University of London, Sep. 2009, pp. 62-70.

* cited by examiner

| | Term | Role | Attribute | Freq | numdocs | Keep | Key | Parent | Parent_id | _ispar | sent |
|---|---|---|---|---|---|---|---|---|---|---|---|
| 1 | no | Abbr | Mixed | 13523 | 7890 | Y | 168 | 655947 | 655947 | | N |
| 2 | etc | Abbr | Mixed | 3168 | 2301 | N | 1028 | . | 1028 | | N |
| 3 | co | Abbr | Mixed | 806 | 400 | Y | 2144 | . | 2144 | | N |
| 4 | dr | Abbr | Mixed | 1263 | 715 | Y | 2287 | . | 2287 | | N |
| 5 | mr. | Abbr | Mixed | 3342 | 982 | Y | 3341 | . | 3341 | | N |
| 6 | ca | Abbr | Mixed | 269 | 173 | Y | 4458 | . | 4458 | | N |
| 7 | app | Abbr | Mixed | 2152 | 797 | Y | 5478 | 592677 | 592677 | | N |
| 8 | mph | Abbr | Mixed | 40 | 25 | Y | 7194 | . | 7194 | | N |
| 9 | ipm | Abbr | Mixed | 29 | 10 | Y | 14223 | . | 14223 | | N |
| 10 | mr | Abbr | Mixed | 619 | 456 | Y | 30333 | . | 30333 | | N |

*Fig. 9*

| _TERMNUM_ | _DOCUMENT_ | _COUNT_ | _OFFSET_ | _LENGTH_ | order |
|---|---|---|---|---|---|
| 39 | 1 | 4 | 0 | 4 | 1 |
| 40 | 1 | 1 | 5 | 10 | 2 |
| 41 | 1 | 1 | 16 | 5 | 3 |
| 42 | 1 | 2 | 22 | 6 | 4 |
| 43 | 1 | 16 | 29 | 2 | 5 |
| 44 | 1 | 1 | 38 | 7 | 6 |
| 45 | 1 | 3 | 47 | 7 | 7 |
| 46 | 1 | 1 | 55 | 5 | 8 |
| 47 | 1 | 1 | 61 | 3 | 9 |
| 48 | 1 | 1 | 65 | 5 | 10 |
| 49 | 1 | 1 | 71 | 18 | 11 |
| 50 | 1 | 1 | 90 | 9 | 12 |

Fig. 10

| Doc ID | Term | Order |
|---|---|---|
| 1003 | XCorp | 1 |
| 1003 | has | 2 |
| 1003 | great | 3 |
| 1003 | customer service | 4 |
| ~~1003~~ | ~~customer~~ | ~~4~~ |
| ~~1003~~ | ~~service~~ | ~~5~~ |

*Fig. 11*

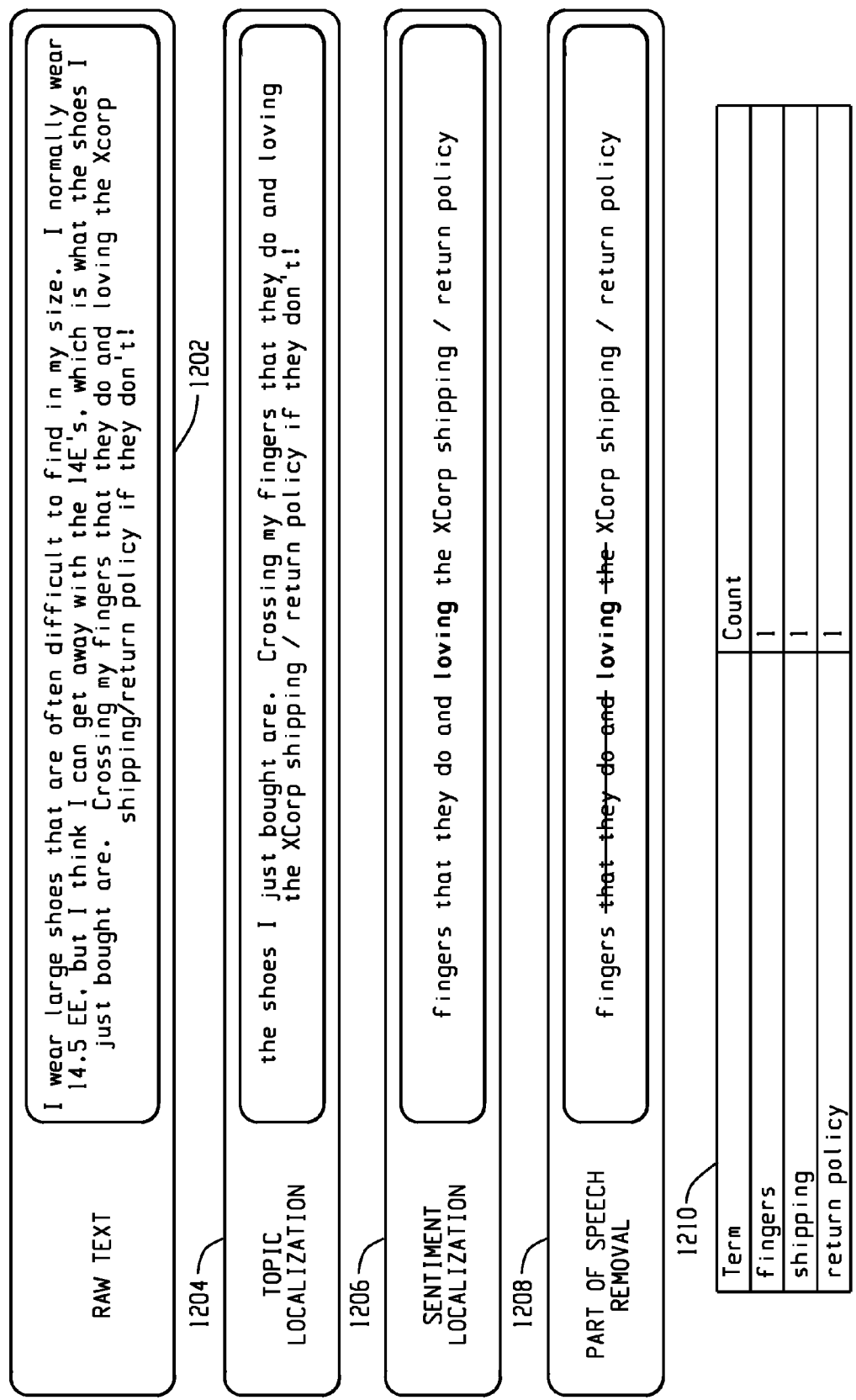

MATCH TO FIG. 13B

| | Term | XCorp | Xcorp.com | customer | shoe | company | service |
|---|---|---|---|---|---|---|---|
| 2321 | coupon code | 0.0013116356 | 0.0050283087 | 0.0025310183 | 0.0028881056 | 0.0010697093 | 0.0002912569 |
| 2322 | couponcraze.com | 0 | 0 | 0 | 0.000489693 | 0 | 0 |
| 2323 | coupons | 0.0058928611 | 0.0262347653 | 0.0004964424 | 0.0022604001 | 0 | 0 |
| 2324 | coupons.com | 0 | 0 | 0 | 0 | 0.0121577303 | 0.0038944312 |
| 2325 | courage | 0.0005511188 | 0.0011349936 | 0.0026524799 | 0.0006967652 | 0.0003621834 | 0.0006574273 |
| 2326 | courier | 0.0007992413 | 0 | 0.0008812963 | 0.0005015894 | 0.0007821891 | 0 |
| 2327 | course | 0.0023116356 | 0.001886208 | 0.0021903926 | 0.0026175446 | 0.0018218444 | 0.0020469736 |
| 2328 | court | 0.0011269768 | 0.0018032963 | 0.0003241772 | 0.0013533808 | 0.0007992262 | 0.0007833984 |
| 2329 | courtesy | 0.0049902673 | 0.0134680648 | 0.0004402079 | 0.0022548973 | 0.0020511949 | 0.0003545984 |
| 2330 | cousin | 0.0006448234 | 0.0013184032 | 0.0006320221 | 0.0004496439 | 0.00018698240 | 0.0001272774 |
| 2331 | couture | 0.0138435417 | 0.004508673 | 0.0020600732 | 0.0055741318 | 0.0004396165 | 0.0020674994 |
| 2332 | couture.zappos.com | 0.0064449818 | 0.0013790284 | 0.0001652712 | 0.0035744341 | 0 | 0 |

Fig. 13A

| amazon | Xcorp.com | business | Smith | brand | culture | tony |
|---|---|---|---|---|---|---|
| 0.002344379 | 0.000241326 | 0.0016480739 | 0 | 0 | 0 | 0 |
| 0 | 0 | 0 | 0 | 0 | 0 | 0 |
| 0.0032188406 | 0 | 0 | 0 | 0 | 0 | 0 |
| 0 | 0 | 0.0055091485 | 0 | 0.0038191122 | 0 | 0 |
| 0 | 0 | 0.004650056 | 0.0007425345 | 0.0006447125 | 0.0108130539 | 0.0019298564 |
| 0 | 0 | 0.0100424899 | 0.001069076 | 0 | 0 | 0.0027785419 |
| 0.001634168 | 0.0001976887 | 0.0065730482 | 0.0009928682 | 0.0038916172 | 0.0022157186 | 0.0011059188 |
| 0.0012844972 | 0.000072122 | 0.0017238864 | 0 | 0.0015364946 | 0 | 0.0005110312 |
| 0.0007135566 | 0.002203565 | 0.0220714031 | 0.0010012574 | 0.006259328 | 0.0002651031 | 0.002428796 |
| 0.0005122393 | 0 | 0.0010802966 | 0 | 0.0004992633 | 0 | 0 |
| 0.0005839183 | 0.0040121725 | 0.0049258618 | 0 | 0.0066160971 | 0.0004881137 | 0.0008518003 |
| 0 | 0.0006618435 | 0.0007533152 | 0 | 0 | 0 | 0 |

MATCH TO FIG. 13A

*Fig. 13B*

MATCH TO FIG. 14B

|   | Term | xcorp | Xcoxp.com | customer | shoe | company | service |
|---|---|---|---|---|---|---|---|
| 1 | checkout | 0.00074262 | 0.0039177134 | 0.0033709598 | 0.002682768 | 0.0003923619 | 0.0061320052 |
| 2 | culture | 0.0110931302 | 0.0033660223 | 0.0042240638 | 0.001030504 | 0.0054164922 | 0.0036149201 |
| 3 | customer service | 0.006670146 | 0.0027872118 | 0.006264455 | 0.0014372953 | 0.0036870955 | 0.0047832179 |
| 4 | discount | 0.0017404008 | 0.0016577772 | 0.0013607429 | 0.0065362514 | 0.001256154 | 0.0013429995 |
| 5 | Smith | 0.0137946289 | 0.011663121 | 0.0017589845 | 0.0012008472 | 0.0026230191 | 0.0015266989 |
| 6 | price | 0.0022504372 | 0.0027956743 | 0.001756684 | 0.0033905866 | 0.0015048463 | 0.0012881011 |
| 7 | selection | 0.0019519946 | 0.0028906117 | 0.0016725631 | 0.0054632486 | 0.0006762467 | 0.0015081285 |
| 8 | shipping | 0.003629873 | 0.003441742 | 0.002266781 | 0.0042957731 | 0.0005649441 | 0.0021685746 |
| 9 | variety | 0.0021198414 | 0.0039325838 | 0.002144294 | 0.0048546086 | 0.0025200321 | 0.0041548142 |
| 10 | return policy | 0.0031481572 | 0.0037195436 | 0.0026794435 | 0.0036232186 | 0.0022254321 | 0.0022678958 |
| 11 | n/a | 0.0033333333 | 0.0033333333 | 0.0033333333 | 0.0033333333 | 0.0033333333 | 0.0033333333 |

Fig. 14A

| amazon | xcorp.com | business | Smith | brand | culture | tony |
|---|---|---|---|---|---|---|
| 0.0332929939 | 0.0005313578 | 0.0008232332 | 0 | 0.0007644699 | 0.0002260962 | 0 |
| 0.0048480206 | 0.0012204324 | 0.0040077913 | 0.013357109 | 0.0076672065 | 0.1765626784 | 0.011507728 |
| 0.0028860657 | 0.0027947093 | 0.0035546821 | 0.0076132132 | 0.0033312237 | 0.0061526473 | 0.0050704168 |
| 0.0034470463 | 0.0069380308 | 0.0010214076 | 0.0010170587 | 0.0019729019 | 0.0015044751 | 0.0000293031 |
| 0.0046611172 | 0.0040801486 | 0.0035336226 | 0.1160948304 | 0.0214436163 | 0.0088126363 | 0.0794752978 |
| 0.0076491765 | 0.0025525768 | 0.0007153998 | 0.0003674157 | 0.0027905118 | 0.0002569359 | 0.0004219638 |
| 0.0038228083 | 0.0180344102 | 0.0003617646 | 0.0000728909 | 0.0023188716 | 0.0015013878 | 0.0001076305 |
| 0.0050002407 | 0.0062011582 | 0.0007412938 | 0.0003593541 | 0.0005996403 | 0.0006853593 | 0.000282998 |
| 0.0012001863 | 0.0042003251 | 0.0038826669 | 0.0053549496 | 0.0041725831 | 0.0008936329 | 0.0051396164 |
| 0.003132713 | 0.0031676655 | 0.0022950565 | 0.0022772218 | 0.0017807436 | 0.0020217937 | 0.0011594961 |
| 0.0033333333 | 0.0033333333 | 0.0033333333 | 0.0033333333 | 0.0033333333 | 0.0033333333 | 0.0033333333 |

*Fig. 14B*

| Culture (Attribute Seed) | Distance |
|---|---|
| Culture | 0 |
| company culture | 26.172 |
| employee | 40.2444 |
| emphasis | 40.7081 |
| core | 41.857 |
| long term | 42.3004 |
| hire | 42.7003 |
| belief | 44.7886 |
| great company | 45.7944 |
| values | 47.4209 |
| core value | 51.514 |
| return policy | 51.7623 |
| openness | 56.0687 |

Fig. 15

| Term | Synonym | Attribute | Similarity |
|---|---|---|---|
| edition | version | Site User Experience | 0.94734 |
| variety | kind | Variety | 0.92821 |
| success | winner | Smith | 0.91657 |
| delivery | post | Shipping | 0.89367 |
| style | fashion | Variety | 0.87936 |
| woman | girl | Selection | 0.87936 |
| shop | outlet | Price | 0.87936 |
| store | magazine | Price | 0.86266 |
| approach | move | Customer Service | 0.86266 |

Fig. 16

COMPUTER-IMPLEMENTED SYSTEMS AND METHODS FOR TAXONOMY DEVELOPMENT

TECHNICAL FIELD

This document relates generally to document analysis and more particularly to identifying classifiers contained within a collection of documents.

BACKGROUND

Development of a taxonomy involves the assignment of classifiers to attributes of an entity. An attribute is a feature of the entity. For example, where the entity is a company, attributes of the company may include customer service, pricing, and shipping policy. A classifier is a word that is related to an attribute that describes the attribute for a particular entity. Taxonomy development may be used to identify buzz topics, topics that are currently of interest to customers and the public, related to the entity. By identifying areas of interest for the entity, both in volume and sentiment, information about public perception of the entity may be gained and used to select actions that can be taken to benefit the entity.

SUMMARY

In accordance with the teachings herein, systems and methods are provided for generating a set of classifiers. A location for each instance of a topic term in a collection of documents is determined. One or more topic term phrases are identified by parsing words in the collection of documents, where each topic term phrase includes one or more words that appear within a topic threshold distance of a topic term. One or more sentiment terms are identified within each topic term phrase. One or more candidate classifiers are identified by parsing words in the one or more topic term phrases, where each candidate classifier is a word that appears within a sentiment threshold distance of a sentiment term. A colocation matrix is generated, where each candidate classifier is associated with a row, and where the colocation matrix is generated using the locations of the candidate classifiers as they appear within the collection of documents. A seed row is identified, where the seed row is selected from among the plurality of rows, and where the seed row is associated with a particular attribute. Distance metrics are determined by comparing each row of the colocation matrix to the seed row, and a set of classifiers are generated for the particular attribute, where classifiers in the set of classifiers are selected using the distance metrics.

As another example, a system for generating a set of classifiers may include one or more data processors and one or more computer readable mediums encoded with instructions for commanding the one or more data processors to execute a method. In the method, a location for each instance of a topic term in a collection of documents is determined. One or more topic term phrases are identified by parsing words in the collection of documents, where each topic term phrase includes one or more words that appear within a topic threshold distance of a topic term. One or more sentiment terms are identified within each topic term phrase. One or more candidate classifiers are identified by parsing words in the one or more topic term phrases, where each candidate classifier is a word that appears within a sentiment threshold distance of a sentiment term. A colocation matrix is generated, where each candidate classifier is associated with a row, and where the colocation matrix is generated using the locations of the candidate classifiers as they appear within the collection of documents. A seed row is identified, where the seed row is selected from among the plurality of rows, and where the seed row is associated with a particular attribute. Distance metrics are determined by comparing each row of the colocation matrix to the seed row, and a set of classifiers are generated for the particular attribute, where classifiers in the set of classifiers are selected using the distance metrics.

As a further example, a computer-readable medium may be encoded with instructions for commanding one or more data processors to execute a method of generating a set of classifiers. In the method, a location for each instance of a topic term in a collection of documents is determined. One or more topic term phrases are identified by parsing words in the collection of documents, where each topic term phrase includes one or more words that appear within a topic threshold distance of a topic term. One or more sentiment terms are identified within each topic term phrase. One or more candidate classifiers are identified by parsing words in the one or more topic term phrases, where each candidate classifier is a word that appears within a sentiment threshold distance of a sentiment term. A colocation matrix is generated, where each candidate classifier is associated with a row, and where the colocation matrix is generated using the locations of the candidate classifiers as they appear within the collection of documents. A seed row is identified, where the seed row is selected from among the plurality of rows, and where the seed row is associated with a particular attribute. Distance metrics are determined by comparing each row of the colocation matrix to the seed row, and a set of classifiers are generated for the particular attribute, where classifiers in the set of classifiers are selected using the distance metrics.

BRIEF DESCRIPTION OF THE FIGURES

FIG. 9 depicts a table data structure generated as part of a text mining operation.

FIG. 10 depicts an offset data structure.

FIG. 11 depicts a text mining data structure where certain word records are replaced by noun group records.

FIG. 12 depicts example operations for identifying candidate classifiers in a portion of text.

FIG. 13 depicts an example colocation matrix.

FIG. 14 depicts a classifier clustering data structure.

FIG. 15 is a table identifying distances between a seed word and a number of candidate classifiers.

FIG. 16 depicts an example operation to determine the similarity between a word selected for the set of classifiers and a synonym to determine whether to include the synonym in the set of classifiers.

DETAILED DESCRIPTION

Figure 1:
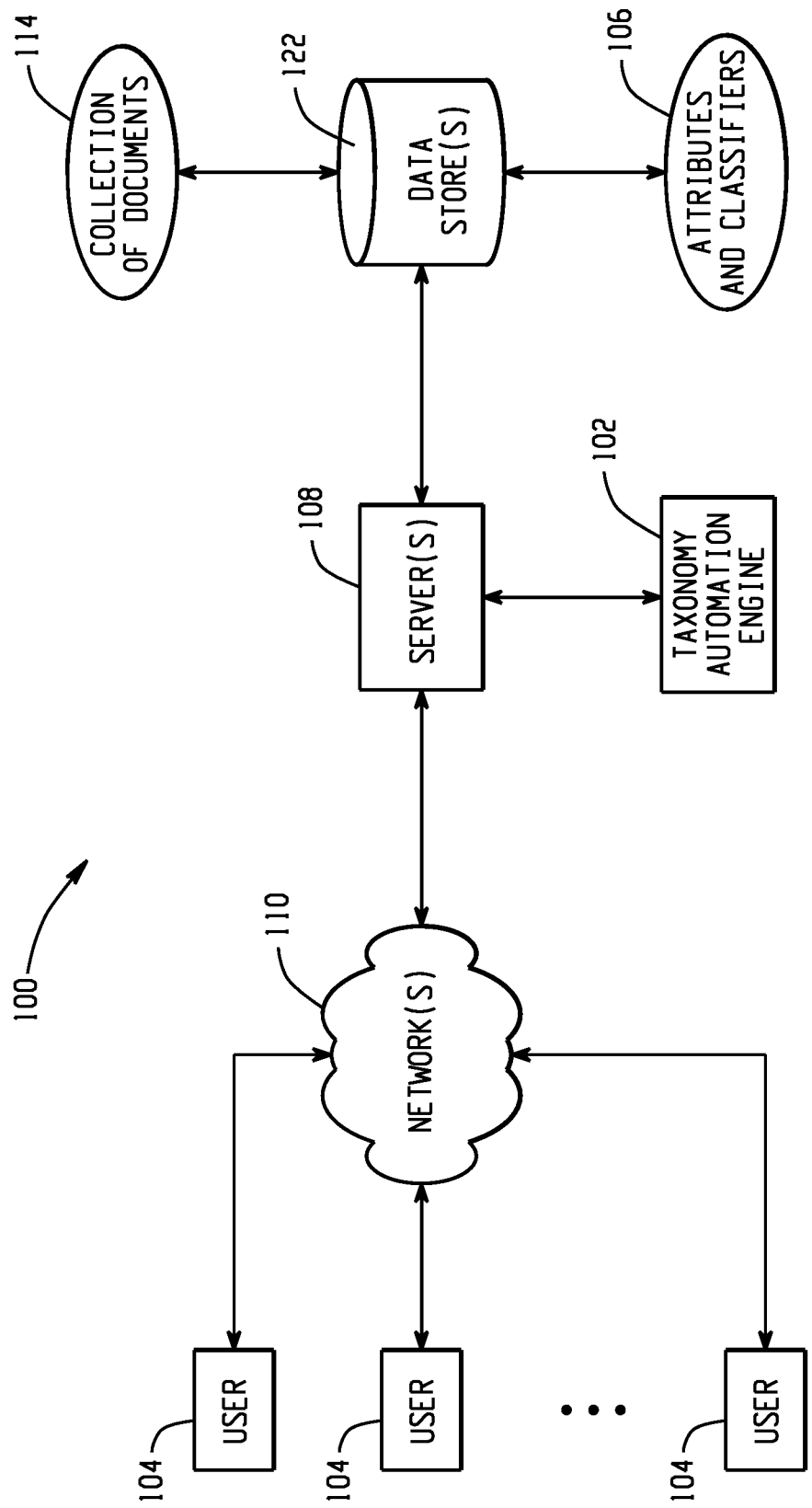
FIG. 1 is a block diagram depicting a computer-implemented taxonomy automation engine.

FIG. 1 is a block diagram depicting a computer-implemented taxonomy automation engine. A taxonomy automation engine 102 assigns classifiers (related words) to appropriate attributes (e.g., categories that form mutually exclusive clusters) through a data driven approach for a given topic. In social media analytics, taxonomies may be used to identify areas of interest for a topic by volume or sentiment. Once classifiers are identified, further investigation can be performed in the areas of interest and actions can be determined and taken to benefit an entity.

The current method of taxonomy creation is done completely through human scoring. Human scoring is done based on a sample of a text corpus. In the current process, once selecting a sample of the corpus is complete, a linguist reads through the sample of documents and attempts to identify classifiers and map them to attributes. The human scoring is limited to how well the sample represents all of the potential classifiers. Depending on the complexity of the topic and corpus, manual creation of a taxonomy can take significant amounts of effort and time (e.g., over 4 weeks).

Automating taxonomy development via a taxonomy automation engine 102 reduces time of implementation and provides capabilities for searching the entire text corpus. Depending on the size of the corpus, which may range from tens to hundreds of thousands of documents, the automated process can be near instant or take a couple of hours to complete, but the automated processing will be significantly faster than a manual process. The automated process can be further streamlined using grid-processing. The automated approach is data-driven, which helps eliminate human error. The end result is a taxonomy that can be produced quickly and which accurately represents the corpus.

The taxonomy automation engine 102 provides a platform for users 104 to generate a set of classifiers from a collection of documents. A user 104 accesses the taxonomy automation engine 102, which is hosted via one or more servers 108, via one or more networks 110. The one or more servers 108 communicate with one or more data stores 112. The one or more data stores 112 may contain a variety of data that includes the collection of documents 114 as well as attributes and classifiers 106 for an entity.

Figure 2:
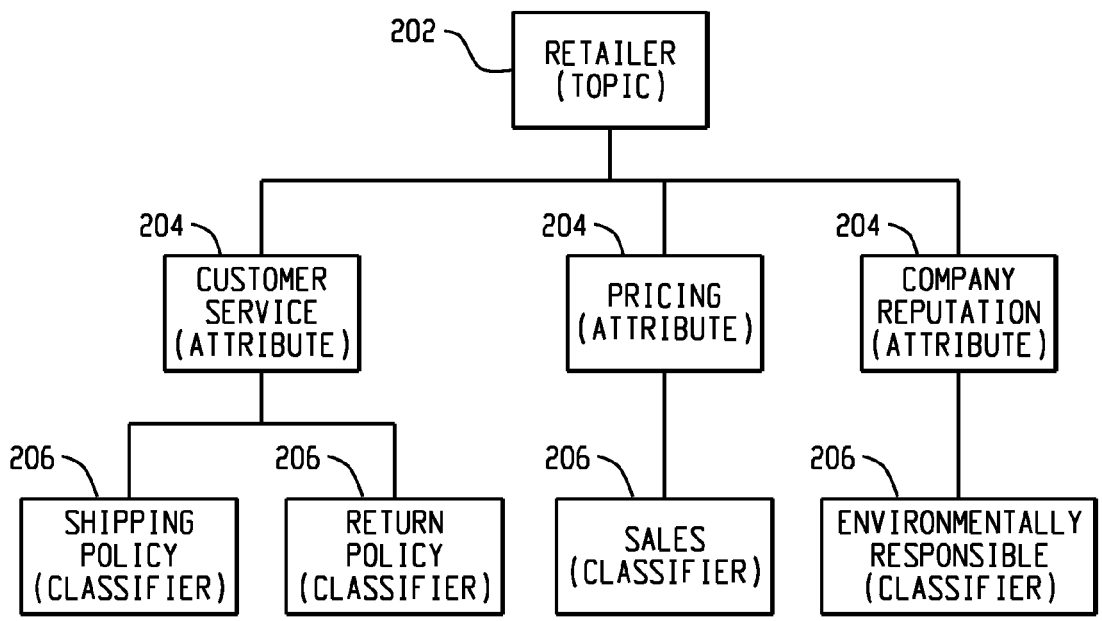
FIG. 2 depicts a taxonomy hierarchy for an entity.

FIG. 2 depicts a taxonomy hierarchy for an entity. The entity 202, a retail company, is displayed at the top level of the hierarchy. A second level of the hierarchy identifies a number of attributes 204 of the company 202. For example, the attributes 204 may be attributes of the company 202 that a marketing department wishes to analyze to identify the level of discussion of those attributes and the sentiment associated with those discussions. A taxonomy automation engine examines a collection of documents to identify classifiers 206 that map to the given attributes, identifying areas of discussion about the attributes 204 in the collection of documents. For example, the analysis depicted in FIG. 2 identifies "environmentally responsible" as a classifier that is related to a company reputation attribute. Example attributes can include a customer service attribute, a product attribute, a product mix attribute, a product price attribute, or a company culture attribute.

Having discovered that environmental responsibility is a topic of discussion related to the company reputation, the company may wish to take action related to that discovered association. If further analysis determines that the sentiment associated with the company's environmental responsibility is positive, then the company may generate advertisements, press releases, or other materials touting the company's environmental responsibility to grasp an opportunity for improving good will and customer loyalty. If further analysis determines that the sentiment associated with the company's environmental responsibility is negative, then the company may take action to reverse that sentiment, such as participating in a community clean-up day, adopting a highway, incorporate recycled materials into a manufactured product, or other action that shows the company acts in an environmentally responsible manner.

The collection of documents analyzed by the taxonomy automation engine may include documents of a variety of forms. For example the collection of documents may include one or more of: websites, books, magazines, broadreader data (news, blogs, forums), and social media postings. The collection of documents may include large numbers of documents (e.g., more than 1000 documents). For example, the collection of documents may be a compilation of posts made by users of a variety of social media portals (e.g., MySpace, Twitter, Facebook, Youtube), where users enter text and other content to the media portals using an input interface device. With millions of such posts being made each day, sorting through all of the posts to locate the ones about an entity, let alone specific aspects of an entity (e.g., attributes) by hand (e.g., by an analyst) is an unmanageable task. Thus, a substantial need is present for an automated mechanism for generating a taxonomy of classifiers that are related to attributes of an entity.

Figure 3:
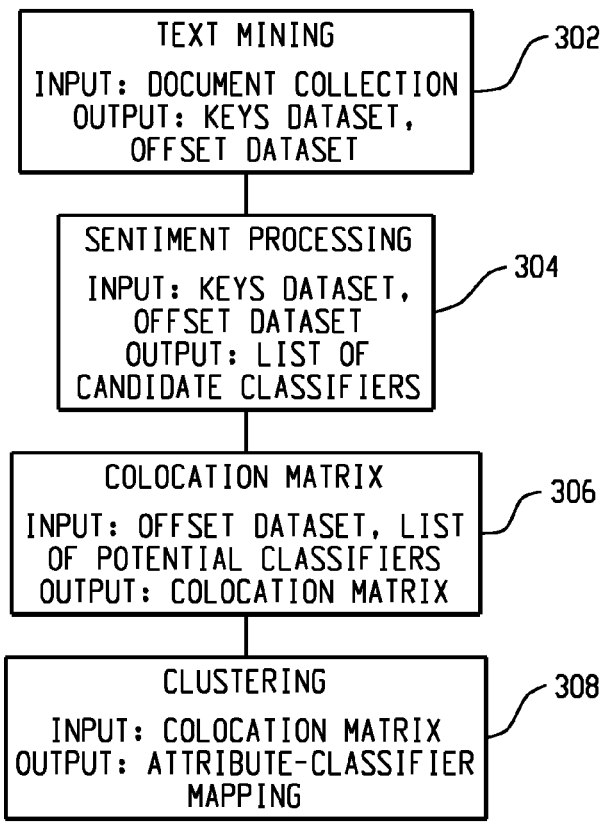
FIG. 3 is a flow diagram depicting a method for generating a set of classifiers from a collection of documents.

FIG. 3 is a flow diagram depicting a method for generating a set of classifiers from a collection of documents. At 302, a text mining process is performed, where a collection (corpus) of documents is analyzed to identify the words that are present in the collection of documents along with the locations of those words in the documents. For example, a database (keys database) may be generated that identifies each word that is present in each document in an individual record. Those records may include a number of attributes associated with the word, such as the document that contains the word, the position (offset) of the word in that document, a stemmed form of the word, and a part of speech of the word.

A sentiment processing operation is depicted at 304. Using the database generated at 302, a number of candidate classifiers are identified within the collection of documents. For example, sentiment processing may be implemented as one or more filters to identify candidate classifiers. A first filtering operation may identify topic term phrases. Identifying a topic term phrase may include searching the collection of documents for appearance of a topic term (or variations of a topic term). For example, the topic term may be an entity name, such as a company name. A topic term phrase may be identified as a collection of words within a topic threshold distance of instances of the topic term (e.g., where the entity and topic term are X-Corp, topic term phrases include all words within a threshold distance, 15 words, of X-Corp in the collection of documents).

Sentiment processing may continue by identifying sentiment terms within the identified topic term phrases. Sentiment terms are words that connote human feeling, such as like, love, hate, and dislike. Sentiment words may be identified by comparing words in topic term phrases to words in a sentiment term list. Having located sentiment words within topic term phrases, one or more candidate classifiers can be identified. For example, candidate classifiers may be identified as being a word that appears within a sentiment threshold distance (e.g., five words) of a located sentiment term.

After identifying a set of candidate classifiers, a colocation matrix operation is performed at 306. A colocation matrix is generated, for example, as a table, where each candidate classifier is associated with a row. Using the locations of the candidate classifiers in the collection of documents, such as through the keys database, colocation calculations are made to determine colocation values among each of the candidate classifiers. For example, a colocation value may be based on a number of times one candidate classifier occurs within a colocation proximity (e.g., fifteen words) of another classifier. The colocation matrix indicates the potential relatedness of candidate classifiers, as candidate classifiers that appear near each other often in the collection of documents will tend to be related terms.

Having made calculations for the colocation matrix at 306, a clustering operation is performed at 308 to select classifiers for a particular attribute. The clustering operation identifies words in the colocation matrix, containing the candidate classifiers, that are related to a selected word. In practice, the selected word is often the particular attribute for which one seeks to identify classifiers. The row in the colocation matrix containing the selected word is identified as a seed row. Distance calculations, such as Euclidean distance calculations, are performed between each row in the colocation matrix and the seed row. Rows having small distances likely contain words that are closely related to the particular attribute. Thus, a set of classifiers can be generated by selecting words from rows that have distance metric values that are small, such as those having distance metric values within a threshold distance from the seed row.

Figure 4:
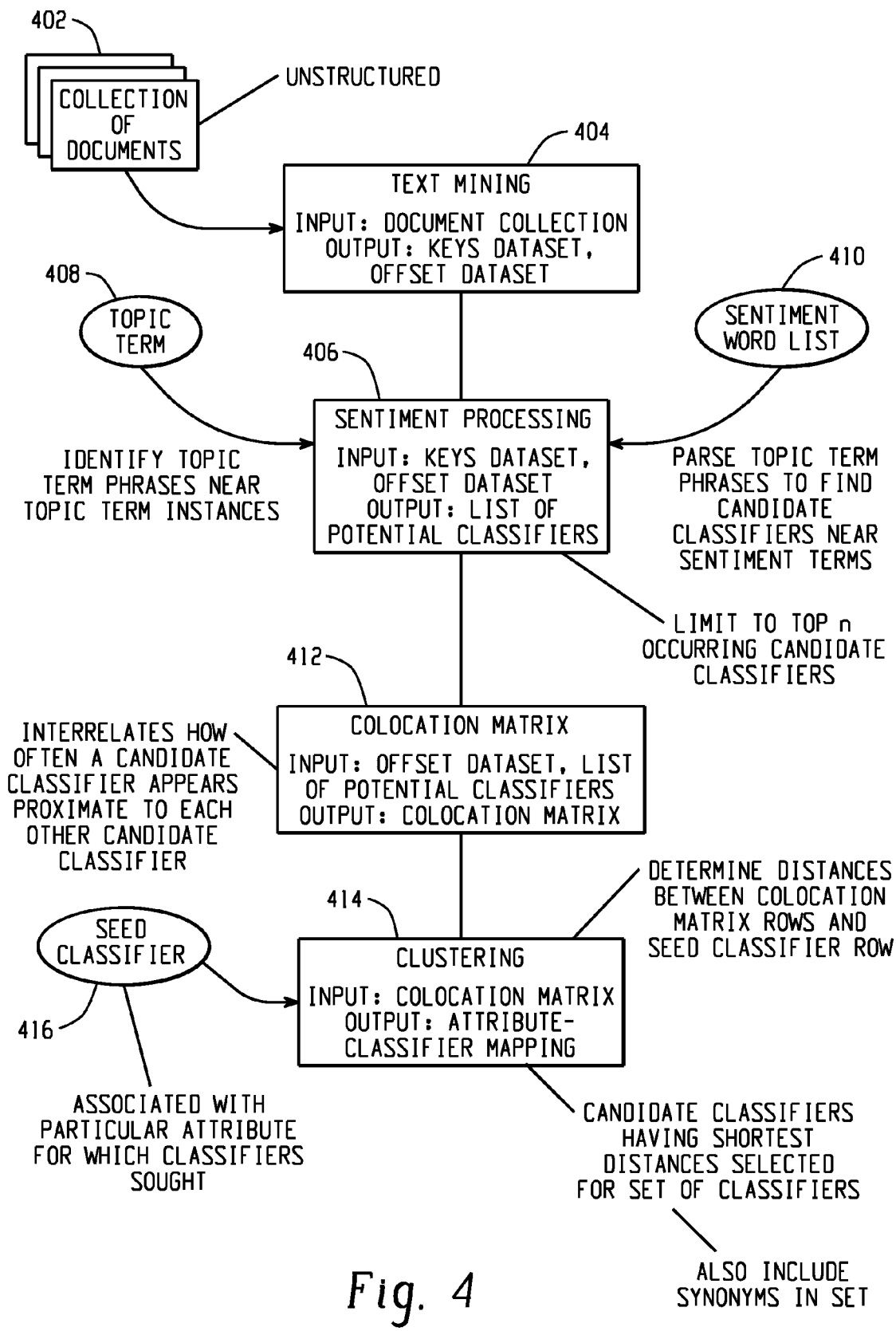
FIG. 4 is a block diagram depicting the generation of a set of classifiers.

FIG. 4 is a block diagram depicting the generation of a set of classifiers. A collection of documents 402 is received. The collection of documents 402 may be unstructured documents, such as raw text, or otherwise formatted. At 404, a text mining operation is performed, wherein a keys data set is generated that includes words appearing in the collection of documents 402 and the location of those words in the documents 402. The dataset may include other attributes of the words such as parts of speech and stemmed forms of the words.

At 406, the keys data set is used for performing a sentiment processing operation. In the sentiment processing operation, topic terms 408 are used to identify topic term phrases that include words within a topic threshold distance of the topic term 408 in the collection of documents. The topic term phrases are further searched to find sentiment terms, which can be provided by a sentiment word list 410. The topic term phrases are parsed to find candidate classifiers that are near sentiment terms. For example, candidate classifiers may be identified as all nouns, adjectives, noun groups, and proper nouns appearing within a sentiment threshold distance of a sentiment term found in a topic term phrase.

At 412, a colocation matrix is generated. The colocation matrix identifies how often a candidate classifier appears proximate to each other candidate classifier in the collection of documents 402. The colocation matrix may include a colocation value for each possible pair of candidate classifiers.

At 414, a clustering operation is performed based on a seed classifier 416. The clustering operation identifies candidate classifiers that are particularly related to the particular attribute for which classifiers are sought. The seed classifier 416 is a word associated with the particular attribute and may be the particular attribute itself. The clustering operation determines distances between colocation matrix rows and the seed classifier row. Candidate classifiers having shortest distances are selected for the set of classifiers. If additional classifiers are desired, then the set of classifiers can be expanded by including synonyms for the classifiers selected for the set.

Figure 5:
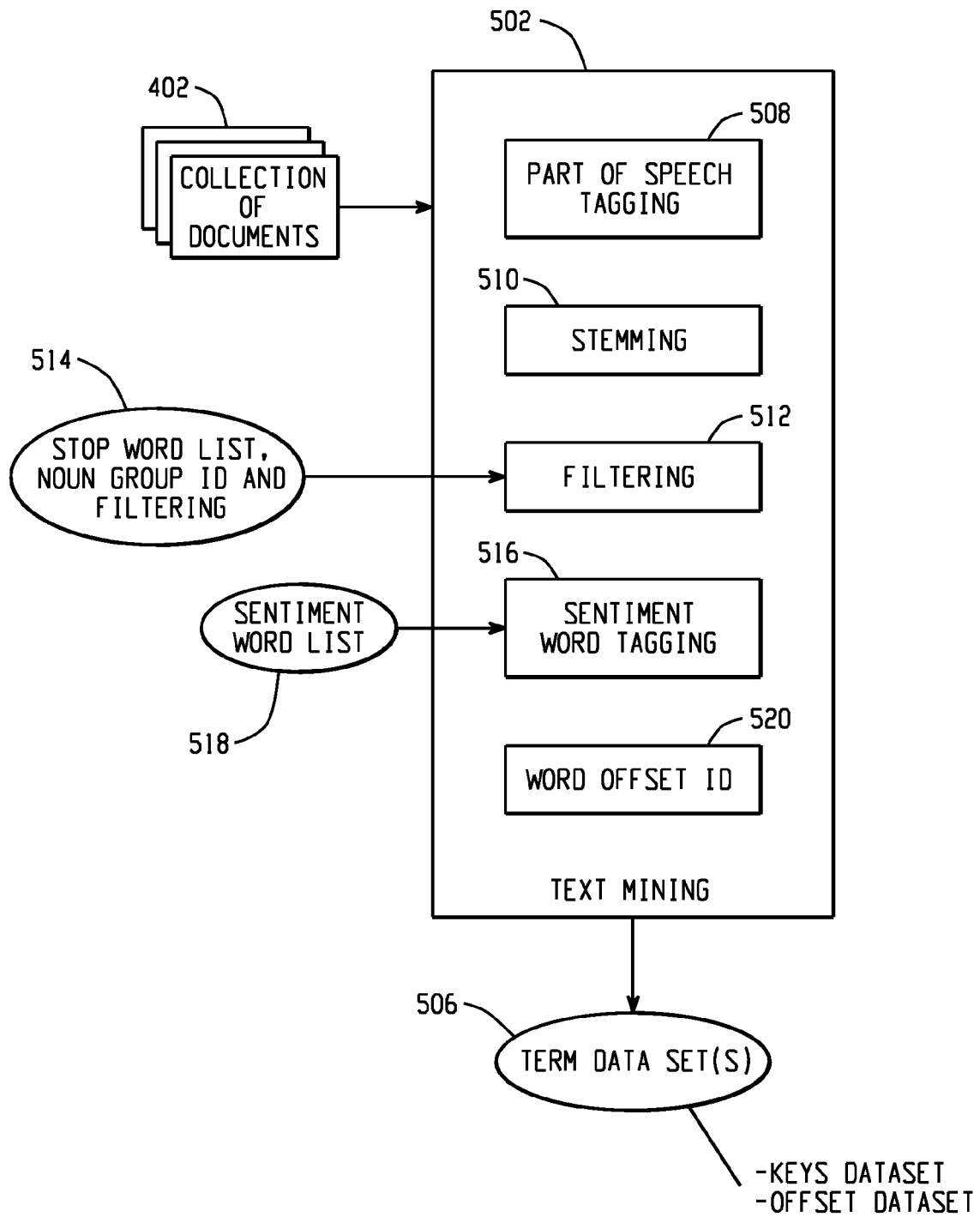
FIG. 5 is a block diagram depicting example operations that may be performed as part of a text mining operation.

FIG. 5 is a block diagram depicting example operations that may be performed as part of a text mining operation. A text mining operation 502 analyzes a collection of documents 504 to generate a term data set 506 that contains words in the collection of documents 504 and the location of those words in the documents 504 (offset) in one or more data sets. The text mining operation may include part of speech tagging 508, where the rows of the term data set include a column identifying a part of speech associated with each word (e.g., noun, verb, adjective, adverb, preposition, or article).

A stemming operation may be performed at 510. A stemming operation seeks to identify a root word of a word in the collection of documents, such as by removing endings (e.g. -ed, -ing) and translating words to present tense. The term data set 506 may include only the stemmed version of a word, or the stemmed version may be included as an attribute in a word record.

At 512, filtering may be performed. Filtering may include removing certain words 514 from the term data set 506 that are deemed as unlikely to be relevant to identification of classifiers. For example, articles and conjunctions may be deemed to be of lesser value and are removed from the term data set 506 to speed downstream processing. The filtering operation 512 may further include noun group filtering, where related nouns that appear together in the collection of documents 504 are combined into single records in the term data set 506. For example, the noun group "baseball player" may have its component entries in the term data set 506 combined into a single row record.

At 516, sentiment words in the collection of documents 504 may be tagged in the term data set 506. Sentiment words are words that represent human emotion. Sentiment words in the collection of documents 504 may be identified using a sentiment word list 518 that includes a number of known sentiment words. Sentiment words in the list 518 may be compared to words, or stemmed versions of words, in the collection of documents 504. When a sentiment word is located, a flag for that word may be set in the term data set identifying the word as a sentiment word.

Text mining 502 may also include incorporating a word offset 520 in the records of the term data set 506. A word offset 520 identifies which document from the collection of documents 504 a word in a term data set 506 record appears, as well as the position of appearance (e.g., $187^{th}$ word in document 20) in that document.

Figure 6:
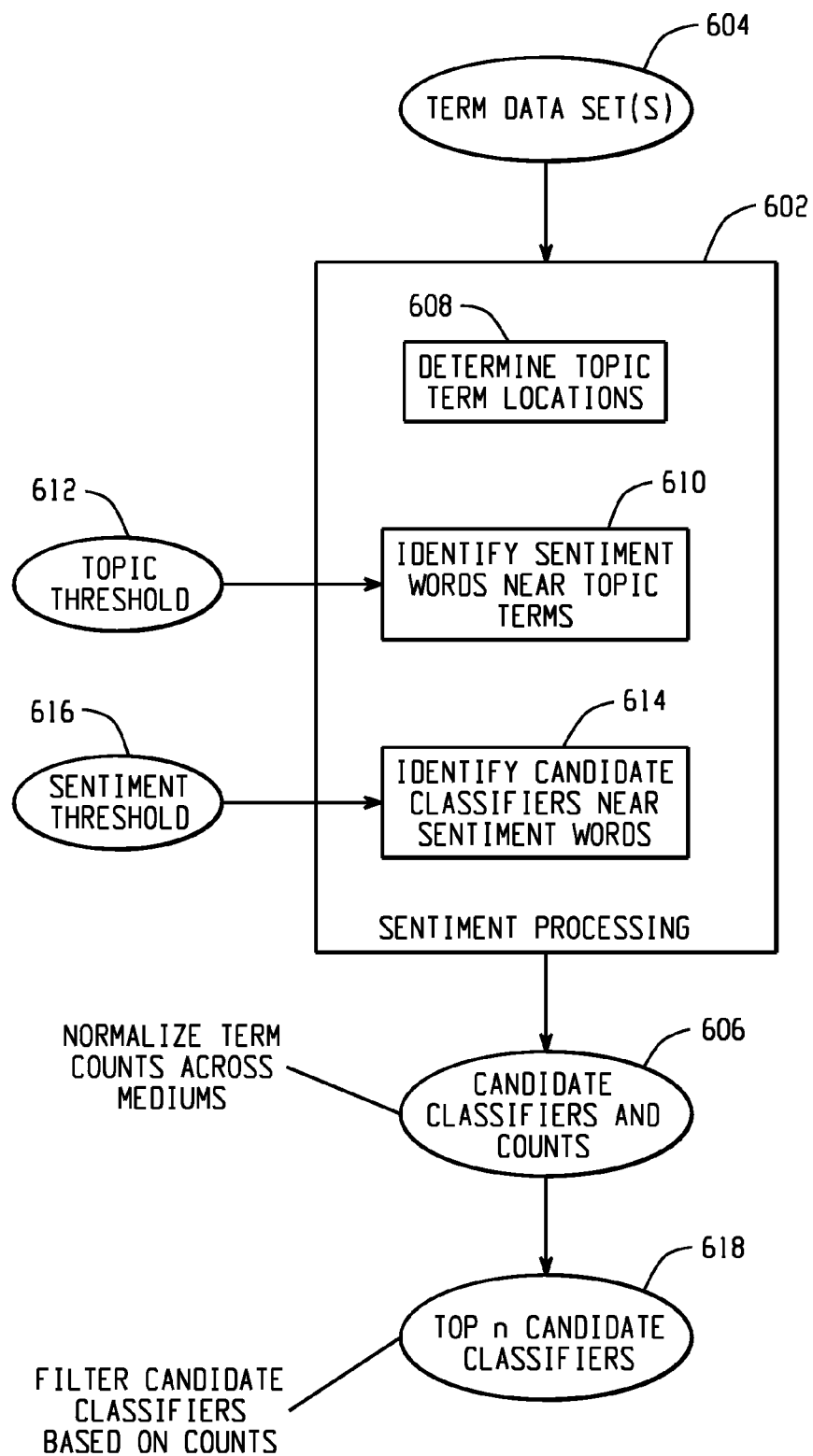
FIG. 6 is a block diagram depicting an example sentiment processing operation.

FIG. 6 is a block diagram depicting an example sentiment processing operation. Sentiment processing 602 uses a term data set 604 to identify candidate classifiers 606 that may include counts of the number of appearances of those candidate classifiers. At 608, a location of topic terms may be determined. A topic term is used to filter the collection of documents in an attempt to locate candidate classifiers that are related to the topic of interest. For example, when a taxonomy is being generated for a person, the topic term may be that person's last name. At 610, sentiment words are identified near topic terms. For example, topic term phrases may be designated as words within a topic threshold 612 distance from topic terms located at 608. At 614, candidate classifiers may be identified that appear near sentiment words. For example, candidate classifiers may be identified as nouns or adjectives that appear within a sentiment threshold 616 number of words of sentiment words found in topic term phrases. The candidate classifiers 606 and other data, such as the number of times a candidate classifier is identified as such, are an output from the sentiment processing 602.

Additional processing may include normalization of candidate classifier counts across different mediums of documents. For example, if a candidate classifier appears often in one type of document media (e.g., social media postings), but very seldom in another document media (e.g., magazine articles), it may be beneficial to normalize the count of that candidate classifier so that the overrepresentation in the one type of document media does not skew the count. Further processing may filter the candidate classifiers 606 to limit the set of candidate classifiers to the top n candidate classifiers 618 (e.g., the top 300 candidate classifiers by count).

Figure 7:
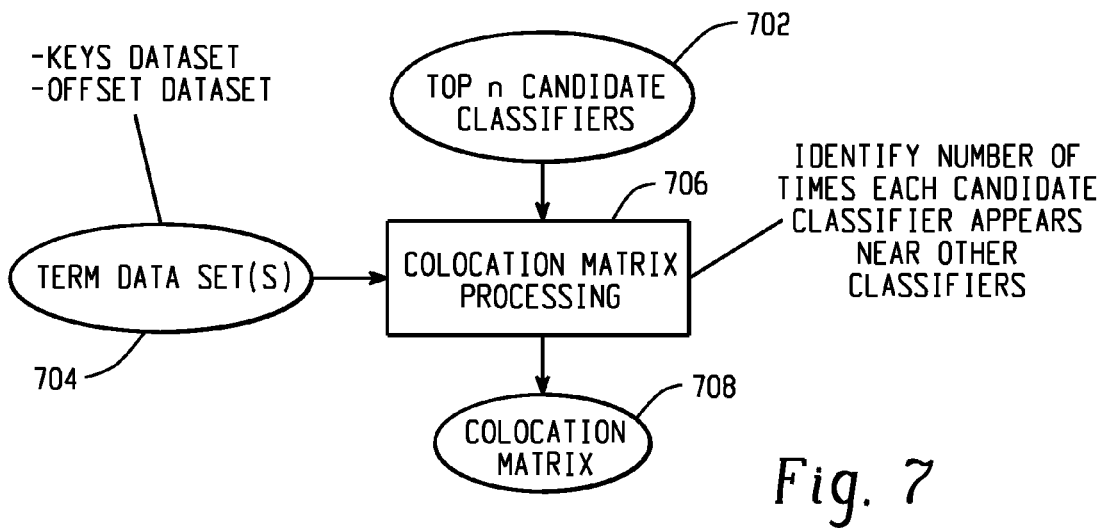
FIG. 7 is a block diagram depicting colocation matrix processing.

FIG. 7 is a block diagram depicting colocation matrix processing. The list 702 of the top n (e.g., 300) candidate classifiers is utilized along with the term data set 704 that includes the words from the collection of documents and their locations 706 to generate a colocation matrix 708. The colocation matrix 708 identifies a frequency that one of the top n candidate classifiers 702 appears near (e.g., within a colocation threshold distance) of another of the top n candidate classifiers (in some implementations the colocation threshold distance is equal to the topic threshold distance). Thus, the colocation matrix 708 can be manifest as an n×n matrix having a value in each cell corresponding to the number of times a pair of candidate classifiers 702 appear within the colocation threshold distance. The values in a column of the colocation matrix 708 may be standardized by dividing the values in that column by the frequency of the associated candidate classifier. Such an operation can balance for variations in frequency among the top n candidate classifiers 702. Rows can also be standardized by dividing values in each row by the sum of the values in the row so that the values in the colocation matrix 308 range from 0 to 1, where the results in a row sum to 1.

Figure 8:
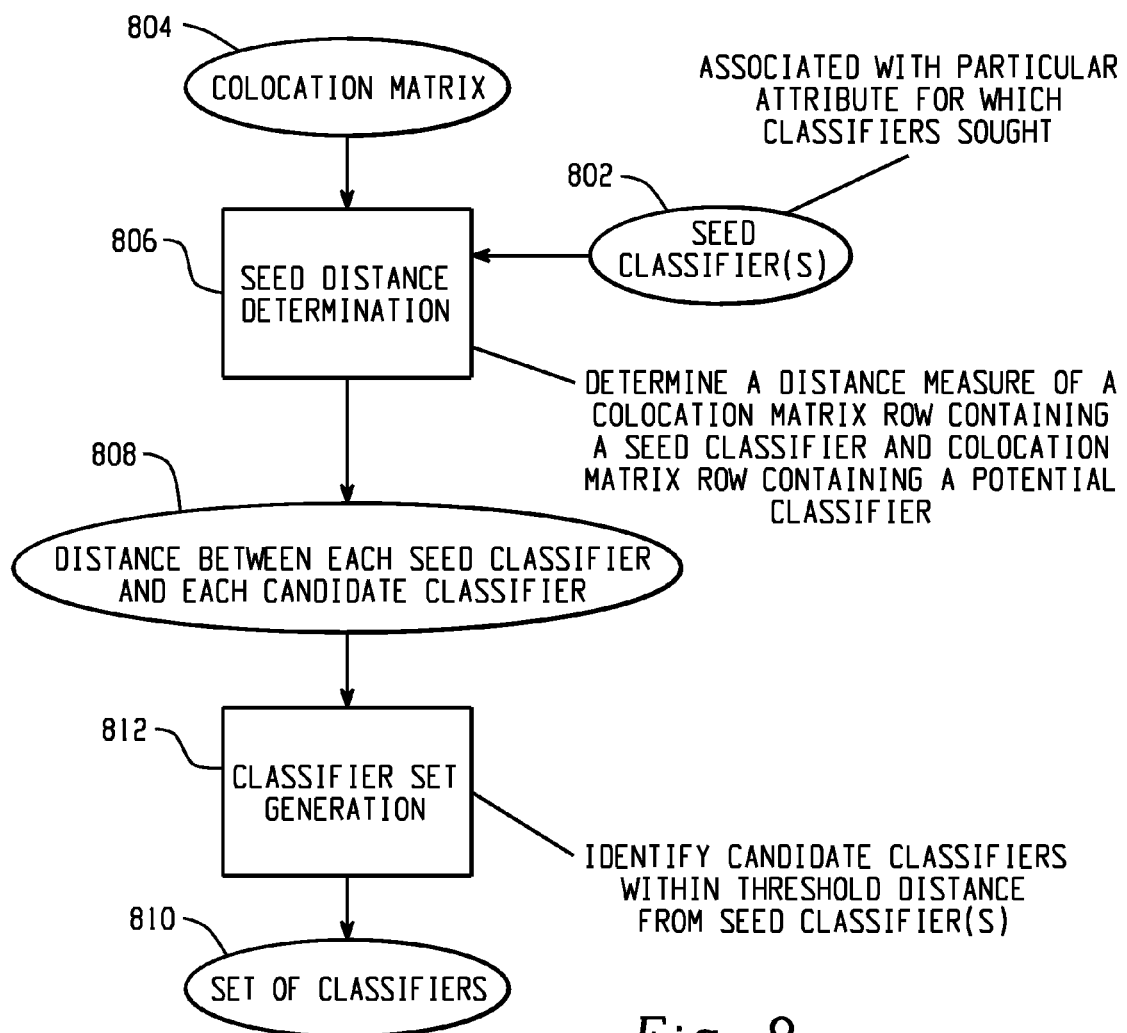
FIG. 8 is a block diagram depicting a clustering operation of identifying a set of classifiers.

FIG. 8 is a block diagram depicting a clustering operation of identifying a set of classifiers. A seed classifier 802 is selected at 802. The seed classifier is associated with the particular attribute for which classifiers are sought. The seed classifier corresponds with one of the rows of the colocation matrix 804. The seed classifier may be the particular attribute itself or a similar or related word. At 806, a seed distance determination 808 is made between each row in the colocation matrix and the seed row associated with the seed classifier. The seed distance determination 806 may be made using a variety of methods including a Euclidean distance calculation between the values of the seed row and a row in the colocation matrix 804. For example, for a particular row in the colocation matrix, the distance metric may be calculated as the square root of the sum of the squares of the differences between each of the attributes of the seed row and the particular colocation matrix row:

$$\text{Distance} = \text{sqrt}((\text{seed row attribute}_1 - \text{particular colocation row attribute}_1)^2 + (\text{seed row attribute}_2 - \text{particular colocation row attribute}_2)^2 + \ldots + (\text{seed row attribute}_n - \text{particular colocation row attribute}_n)^2)$$

Based on the distance metrics 808 calculated between the seed row 802 and the other rows in the colocation matrix 804, a set of classifiers 810 is generated at 812. For example, candidate classifiers whose rows are determined to be within a classifier threshold distance of the seed classifier row may be included in the set of classifiers 810.

A number of data structures may be utilized in a process of generating a set of classifiers. FIG. 9 depicts a table data structure generated as part of a text mining operation. The depicted data set includes a first column labeled Term that contains an instance of a word found in the collection of documents. A role column identifies a part of speech associated with the word. The depicted words in the table of FIG. 9 are labeled as abbreviations. A frequency column identifies the number of times the word appears in the collection of documents, and a numdocs column identifies the number of documents in the collection of documents in which the word appears. The keep column notes whether the row should be retained. For example, if the word appears on a stop list, then that row may have a No value in the keep field, where such rows are removed from the table for future processing. Other columns may include such data as references to other word records, such as parent or child records, where stems of words may be associated with actual forms of appearance via the references.

FIG. 10 depicts an offset data structure. An offset data structure identifies the position of words, such as those depicted in FIG. 9 in different documents in the collection of documents. A term number field links a record in the offset data structure with a word in the text mining data structure of FIG. 9. A document field identifies the document in which a word appears, a count term identifies a number of times the word appears, and an offset identifies which number word in the document that the word referenced in the row appears (e.g., the $103^{rd}$ word of the document). A length identifies the length of the word in the sentence (this may be different than the length of the word in the table of FIG. 9 if the table of FIG. 9 contains only stemmed versions of words).

FIG. 11 depicts a text mining data structure where certain word records are replaced by noun group records. Originally, the data structure included the words: XCorp, has, great, customer, service. Analysis shows that customer and service are nouns appearing adjacent in a document, making them a possible noun group. When analysis deems customer and service a noun group, the individual word records for customer and service are removed from the data structure and are replaced by a customer service noun group record. The noun group can then be treated as a single word for subsequent operations involved in generating a set of classifiers.

FIG. 12 depicts example operations for identifying candidate classifiers in a portion of text. The raw text depicted at 1202 may be all or part of a document in a collection of documents, such as a social media site posting. In this example, XCorp is selected as the topic term. A topic localization operation 1204 identifies a topic term phrase that includes the words in the raw text that are within 15 words of the topic term, XCorp. The topic term phrase is truncated at the right side based on the end of the document after the word "don't!"

A sentiment location operation at 1206 searches for sentiment words in the topic term phrase. Sentiment words to be searched for in the topic term phrase may be accessed from a sentiment term list, table, or other data structure. Words that appear within a five word sentiment threshold of a sentiment word located in a topic term phrase are deemed available for candidate classifier selection. At 1208, words of certain parts of speech of speech that are deemed unlikely to make good classifiers (e.g., verbs, articles, conjunctions) are removed from consideration. The remaining words (e.g., nouns and adjectives) are included in a table at 1210 of candidate classifiers. The table 1210 includes words identified as candidate classifiers after the process of 1202, 1204, 1206, and 1210 and the number of times those words are identified as candidate classifiers across the collection of documents.

FIG. 13 depicts an example colocation matrix. The colocation includes a value in each candidate classifier row identifying a frequency with which another candidate classifier (one identified in each column) appears within a colocation threshold number of words of the candidate classifier of that row. Such a value may be determined using an offset data structure that identifies locations of the candidate classifiers on the collection of documents. The frequencies may be standardized by column by dividing values in a column by the frequency of the column candidate classifiers. The frequencies may also be standardized by row by dividing values by the total of the row, so that the sum of all colocation matrix values for a row equals one. The colocation matrix may then be used for identifying classifiers for a number of seed terms, and the colocation can be reused for multiple classifier identifying operations for different attributes of interest.

FIG. 14 depicts a classifier clustering data structure. The rows are associated with different seed words chosen as being related to attributes for which related classifiers are desired. The values represent distance metrics (e.g., Euclidean distances) between the seed row of the attribute and the candidate classifier row from the colocation metric. A dummy seed row that includes an equal distribution of all of the top n candidate clusters may be used to capture noise. Smaller values in the table of FIG. 14 identify smaller distances, and thus higher perceived relatedness between a seed row and a candidate classifier.

FIG. 15 is a table identifying distances between a seed word and a number of candidate classifiers. The seed word, culture, may be an attribute for which classifiers are sought. Distance metric values range from between 26 and 56. If the threshold for selecting a candidate classifier for the set of classifiers is 45, then Culture, company culture, employee, emphasis, core, long term, hire, and belief are selected for the set of classifiers.

Synonyms for terms selected for the set of classifiers may also be included in the set of classifiers (e.g., include "worker" based on the selection of employee for the set of classifiers). FIG. 16 depicts an example operation to determine the similarity between a word selected for the set of classifiers and a synonym to determine whether to include the synonym in the set of classifiers. A Wordnet relational database is used to identify synonyms for words selected for the set of classifiers. A similarity is measured between a classifier assigned to an attribute and an unassigned classifier. Based on the similarity and potentially other factors (e.g., the distance determined between the particular attribute and the attribute selected for the set), a decision is made as to whether to include the synonym in the set of classifiers. For example, the similarity required to retain a synonym for the set of classifiers may be less when the selected classifier is determined to be very close to the particular attribute's colocation matrix row.

Figure 17A:
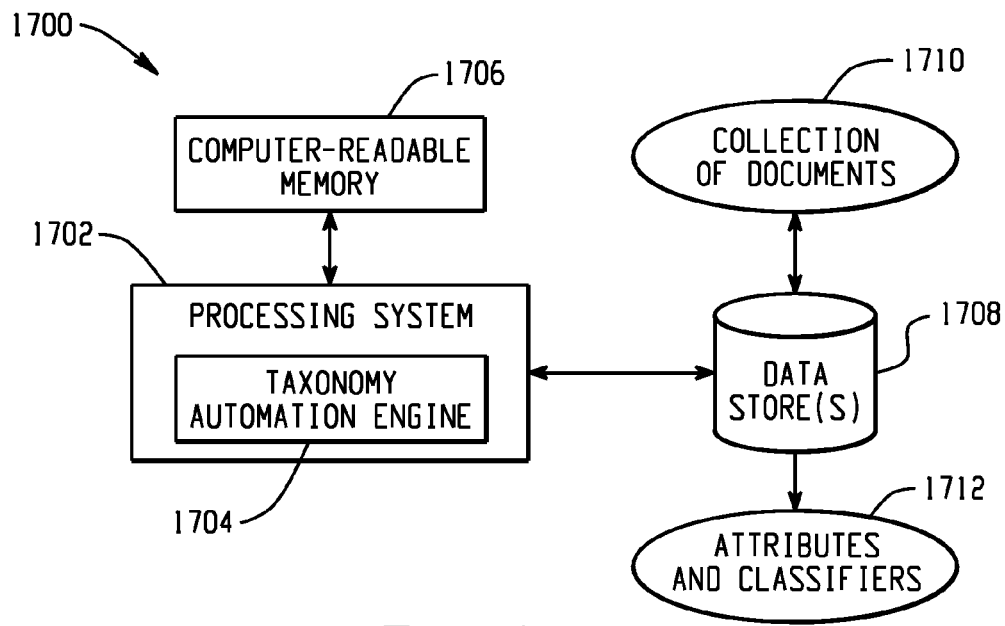
FIGS. 17A, 17B, and 17C depict example systems for use in implementing a taxonomy automation engine.
Figure 17B:
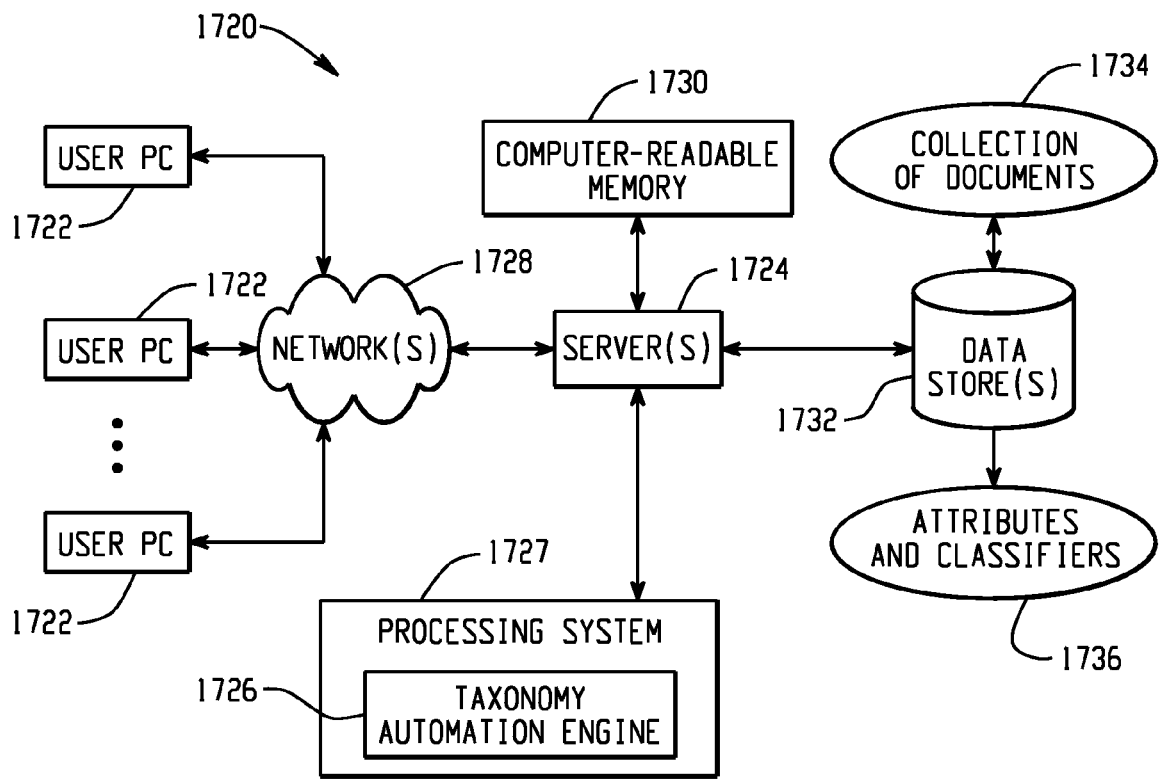
Figure 17C:
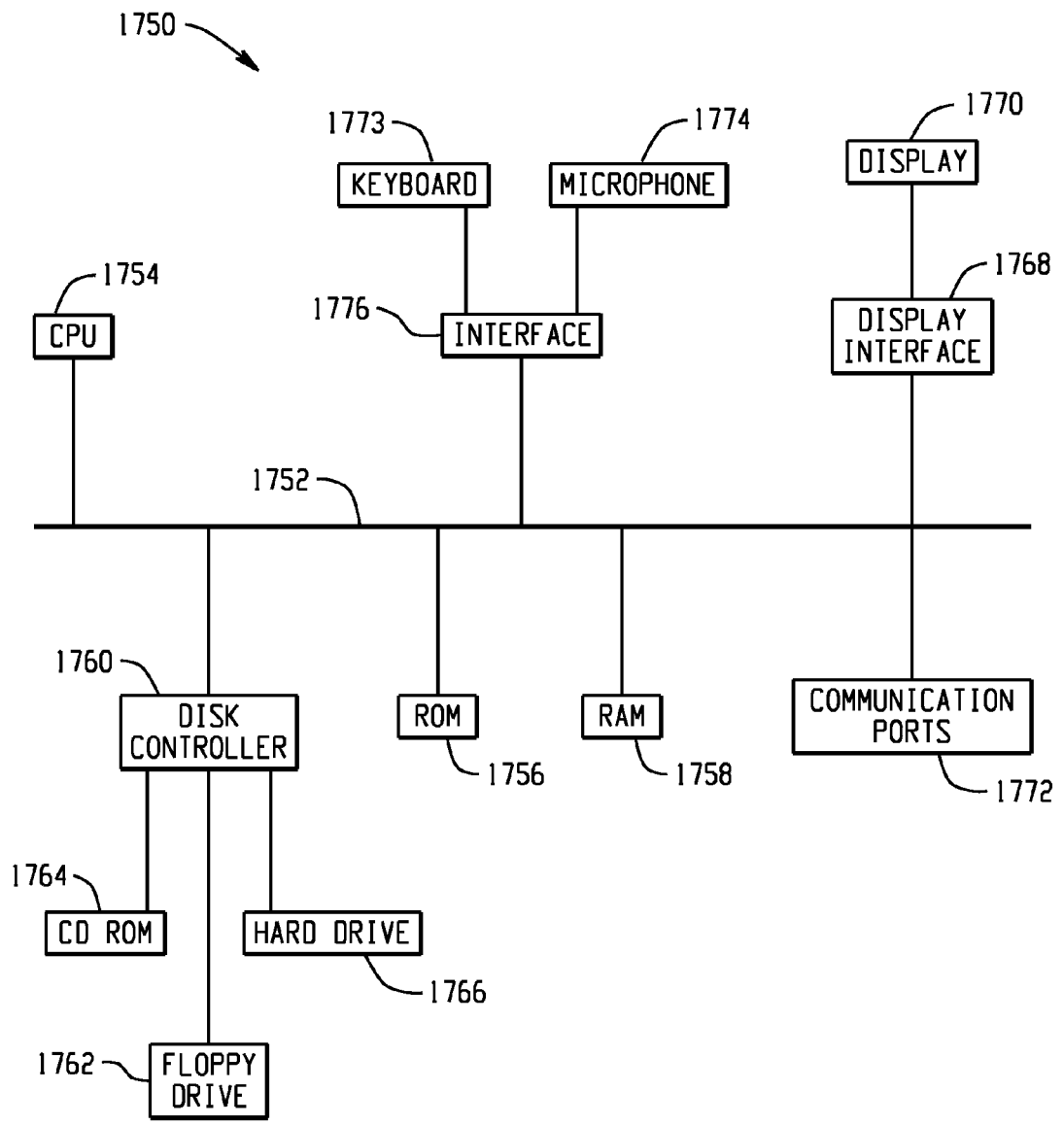

FIGS. 17A, 17B, and 17C depict example systems for use in implementing a taxonomy automation engine. For example, FIG. 17A depicts an exemplary system 1700 that includes a standalone computer architecture where a processing system 1702 (e.g., one or more computer processors located in a given computer or in multiple computers that may be separate and distinct from one another) includes a taxonomy automation engine 1704 being executed on it. The processing system 1702 has access to a computer-readable memory 1706 in addition to one or more data stores 1708. The one or more data stores 1708 may include a collection of documents 1710 as well as attribute and classifier data 1712.

FIG. 17B depicts a system 1720 that includes a client server architecture. One or more user PCs 1722 access one or more servers 1724 running a taxonomy automation engine 1726 on a processing system 1727 via one or more networks 1728. The one or more servers 1724 may access a computer readable memory 1730 as well as one or more data stores 1732. The one or more data stores 1732 may contain a collection of documents 1734 as well as attribute and classifier data 1736.

FIG. 17C shows a block diagram of exemplary hardware for a standalone computer architecture 1750, such as the architecture depicted in FIG. 17A that may be used to contain and/or implement the program instructions of system embodiments of the present invention. A bus 1752 may serve as the information highway interconnecting the other illustrated components of the hardware. A processing system 1754 labeled CPU (central processing unit) (e.g., one or more computer processors at a given computer or at multiple computers), may perform calculations and logic operations required to execute a program. A processor-readable storage medium, such as read only memory (ROM) 1756 and random access memory (RAM) 1758, may be in communication with the processing system 1754 and may contain one or more programming instructions for performing the method of implementing a taxonomy automation engine. Optionally, program instructions may be stored on a non-transitory computer readable storage medium such as a magnetic disk, optical disk, recordable memory device, flash memory, or other physical storage medium.

A disk controller 1760 interfaces one or more optional disk drives to the system bus 1752. These disk drives may be external or internal floppy disk drives such as 1762, external or internal CD-ROM, CD-R, CD-RW or DVD drives such as 1764, or external or internal hard drives 1766. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1760, the ROM 1756 and/or the RAM 1758. Preferably, the processor 1754 may access each component as required.

A display interface 1768 may permit information from the bus 1752 to be displayed on a display 1770 in audio, graphic, or alphanumeric format. Communication with external devices may optionally occur using various communication ports 1772.

In addition to the standard computer-type components, the hardware may also include data input devices, such as a keyboard 1773, or other input device 1774, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for generating a set of classifiers, comprising:
   determining, using one or more data processors, one or more locations of instances of a topic term in a collection of documents;
   identifying, using the one or more data processors, one or more topic term phrases by parsing words in the collection of documents, wherein a topic term phrase includes one or more words that appear within a topic threshold distance of a topic term;
   identifying, using the one or more data processors, one or more sentiment terms within a topic term phrase;
   identifying, using the one or more data processors, one or more candidate classifiers by parsing words in the one or more topic term phrases, wherein a candidate classifier is a word that appears within a sentiment threshold distance of a sentiment term;
   generating, using the one or more data processors, a colocation matrix including a plurality of rows, wherein a candidate classifier is associated with a row, and wherein the colocation matrix is generated using the locations of the candidate classifiers as they appear within the collection of documents;
   standardizing, using the one or more data processors, each of the plurality of rows by dividing values in each row by a sum of the values in the row;
   identifying, using the one or more data processors, a seed row, wherein the seed row is selected from among the plurality of rows, and wherein the seed row is associated with a particular attribute;
   determining, using the one or more data processors, distance metrics by comparing rows of the colocation matrix to the seed row; and
   generating, using the one or more data processors, a set of classifiers for the particular attribute, wherein classifiers in the set of classifiers are selected using the distance metrics.

2. The method of claim 1, further comprising parsing the collection of documents to identify locations of words within the collection of documents.

3. The method of claim 2, wherein stemmed versions of the words and the locations of the words are stored in one or more data structures.

4. The method of claim 3, wherein parts of speech are associated with the words and stored in the one or more data structures.

5. The method of claim 3, wherein noun groups are identified in the collection of documents, wherein individual noun records of the noun groups are removed from the one or more data structures and replaced by a noun group record.

6. The method of claim 1, wherein the sentiment terms are stored in a data structure stored in a computer-readable memory.

7. The method of claim 1, wherein the candidate classifiers are limited to nouns, verbs, or adjectives.

8. The method of claim 1, further comprising determining appearance counts of each of the candidate classifiers in the collection of documents, wherein the colocation matrix is limited to a top N candidate classifiers having highest appearance counts.

9. The method of claim 1, wherein the colocation matrix identifies a frequency that a particular candidate classifier appears within a colocation threshold of each other candidate classifier in the colocation matrix.

10. The method of claim 9, wherein the colocation threshold is equal to the topic threshold distance.

11. The method of claim 1, wherein a distance metric for a particular candidate classifier is determined based on a Euclidean distance calculation using values from the candidate classifier row in the colocation matrix and corresponding values in the seed row in the colocation matrix.

12. The method of claim 1, wherein candidate classifiers having associated distance metrics within a distance threshold are selected for inclusion in the set of classifiers for the particular attribute.

13. The method of claim 1, wherein the collection of documents includes one or more of: websites, books, magazines, and social media postings.

14. The method of claim 1, wherein the collection of documents includes more than 1000 documents.

15. The method of claim 1, wherein the set of classifiers are provided to a downstream computer for processing.

16. The method of claim 1, wherein the collection of documents comprises text entered into a computer by a person using an input interface device.

17. The method of claim 1, wherein the topic term is a company name, and wherein the particular attribute is an attribute of the company.

18. The method of claim 17, wherein the particular attribute is a customer service attribute, a product attribute, a product mix attribute, a product price attribute, or a company culture attribute.

19. The method of claim 1, wherein synonyms of selected classifiers are included in the set of classifiers.

20. The method of claim 1, wherein the colocation matrix is stored in one or more data structures store in a computer-readable medium.

21. The method of claim 1, wherein the one or more sentiment terms are identified by comparing words in topic term phrases to words in a sentiment term list.

22. The method of claim 21, wherein the sentiment term list contains words that connote human feeling.

23. The method of claim 21, wherein the sentiment term list includes the terms: like, love, hate, and dislike.

24. A computer-implemented system for generating a set of classifiers, comprising:
one or more data processors;
a computer-readable medium encoded with instructions for commanding the one or more data processors to execute steps including:
determining one or more locations of instances of a topic term in a collection of documents;
identifying one or more topic term phrases by parsing words in the collection of documents, wherein a topic term phrase includes one or more words that appear within a topic threshold distance of a topic term;
identifying one or more sentiment terms within a topic term phrase;
identifying one or more candidate classifiers by parsing words in the one or more topic term phrases, wherein a candidate classifier is a word that appears within a sentiment threshold distance of a sentiment term;
generating a colocation matrix including a plurality of rows, wherein a candidate classifier is associated with a row, and wherein the colocation matrix is generated using the locations of the candidate classifiers as they appear within the collection of documents;
standardizing, using the one or more data processors, each of the plurality of rows by dividing values in each row by a sum of the values in the row;
identifying a seed row, wherein the seed row is selected from among the plurality of rows, and wherein the seed row is associated with a particular attribute;
determining distance metrics by comparing rows of the colocation matrix to the seed row; and
generating a set of classifiers for the particular attribute, wherein classifiers in the set of classifiers are selected using the distance metrics.

25. The computer-implemented system of claim 24, further comprising parsing the collection of documents to identify locations of words within the collection of documents.

26. The computer-implemented system of claim 25, wherein stemmed versions of the words and the locations of the words are stored in one or more data structures.

27. The computer-implemented system of claim 26, wherein parts of speech are associated with the words and stored in the one or more data structures.

28. The computer-implemented system of claim 26, wherein noun groups are identified in the collection of documents, wherein individual noun records of the noun groups are removed from the one or more data structures and replaced by a noun group record.

29. The computer-implemented system of claim 24, wherein the sentiment terms are stored in a data structure stored in a computer-readable memory.

30. The computer-implemented system of claim 24, wherein the candidate classifiers are limited to nouns, verbs, or adjectives.

31. The computer-implemented system of claim 24, further comprising determining appearance counts of each of the candidate classifiers in the collection of documents, wherein the colocation matrix is limited to a top N candidate classifiers having highest appearance counts.

32. The computer-implemented system of claim 24, wherein the colocation matrix identifies a frequency that a particular candidate classifier appears within a colocation threshold of each other candidate classifier in the colocation matrix.

33. The computer-implemented system of claim 32, wherein the colocation threshold is equal to the topic threshold distance.

34. The computer-implemented system of claim 24, wherein a distance metric for a particular candidate classifier is determined based on a Euclidean distance calculation using values from the candidate classifier row in the colocation matrix and corresponding values in the seed row in the colocation matrix.

35. The computer-implemented system of claim 24, wherein candidate classifiers having associated distance metrics within a distance threshold are selected for inclusion in the set of classifiers for the particular attribute.

36. The computer-implemented system of claim 24, wherein the collection of documents includes one or more of: websites, books, magazines, and social media postings.

37. The computer-implemented system of claim 24, wherein the collection of documents includes more than 1000 documents.

38. The computer-implemented system of claim 24, wherein the set of classifiers are provided to a downstream computer for processing.

39. The computer-implemented system of claim 24, wherein the collection of documents comprises text entered into a computer by a person using an input interface device.

40. The computer-implemented system of claim 24, wherein the topic term is a company name, and wherein the particular attribute is an attribute of the company.

41. The computer-implemented system of claim 40, wherein the particular attribute is a customer service attribute, a product attribute, a product mix attribute, a product price attribute, or a company culture attribute.

42. The computer-implemented system of claim 24, wherein synonyms of selected classifiers are included in the set of classifiers.

43. The computer-implemented system of claim 24, wherein the colocation matrix is stored in one or more data structures store in a computer-readable medium.

44. The computer-implemented system of claim 24, wherein the one or more sentiment terms are identified by comparing words in topic term phrases to words in a sentiment term list.

45. The computer-implemented system of claim 44, wherein the sentiment term list contains words that connote human feeling.

46. The computer-implemented system of claim 44, wherein the sentiment term list includes the terms: like, love, hate, and dislike.

47. A non-transitory computer-readable medium encoded with instructions for commanding one or more data processors to execute method for generating a set of classifiers, the method comprising:
determining one or more locations of instances of a topic term in a collection of documents;
identifying one or more topic term phrases by parsing words in the collection of documents, wherein a topic term phrase includes one or more words that appear within a topic threshold distance of a topic term;
identifying one or more sentiment terms within a topic term phrase;
identifying one or more candidate classifiers by parsing words in the one or more topic term phrases, wherein a candidate classifier is a word that appears within a sentiment threshold distance of a sentiment term;

generating a colocation matrix including a plurality of rows, wherein a candidate classifier is associated with a row, and wherein the colocation matrix is generated using the locations of the candidate classifiers as they appear within the collection of documents;

standardizing, using the one or more data processors, each of the plurality of rows by dividing values in each row by a sum of the values in the row;

identifying a seed row, wherein the seed row is selected from among the plurality of rows, and wherein the seed row is associated with a particular attribute;

determining distance metrics by comparing rows of the colocation matrix to the seed row; and generating a set of classifiers for the particular attribute, wherein classifiers in the set of classifiers are selected using the distance metrics.

48. The non-transitory computer-readable medium of claim 47, further comprising parsing the collection of documents to identify locations of words within the collection of documents.

49. The non-transitory computer-readable medium of claim 48, wherein stemmed versions of the words and the locations of the words are stored in one or more data structures.

50. The non-transitory computer-readable medium of claim 49, wherein parts of speech are associated with the words and stored in the one or more data structures.

51. The non-transitory computer-readable medium of claim 49, wherein noun groups are identified in the collection of documents, wherein individual noun records of the noun groups are removed from the one or more data structures and replaced by a noun group record.

52. The non-transitory computer-readable medium of claim 47, wherein the sentiment terms are stored in a data structure stored in a computer-readable memory.

53. The non-transitory computer-readable medium of claim 47, wherein the candidate classifiers are limited to nouns, verbs, or adjectives.

54. The non-transitory computer-readable medium of claim 47, further comprising determining appearance counts of each of the candidate classifiers in the collection of documents, wherein the colocation matrix is limited to a top N candidate classifiers having highest appearance counts.

55. The non-transitory computer-readable medium of claim 47, wherein the colocation matrix identifies a frequency that a particular candidate classifier appears within a colocation threshold of each other candidate classifier in the colocation matrix.

56. The non-transitory computer-readable medium of claim 55, wherein the colocation threshold is equal to the topic threshold distance.

57. The non-transitory computer-readable medium of claim 47, wherein a distance metric for a particular candidate classifier is determined based on a Euclidean distance calculation using values from the candidate classifier row in the colocation matrix and corresponding values in the seed row in the colocation matrix.

58. The non-transitory computer-readable medium of claim 47, wherein candidate classifiers having associated distance metrics within a distance threshold are selected for inclusion in the set of classifiers for the particular attribute.

59. The non-transitory computer-readable medium of claim 47, wherein the collection of documents includes one or more of: websites, books, magazines, and social media postings.

60. The non-transitory computer-readable medium of claim 47, wherein the collection of documents includes more than 1000 documents.

61. The non-transitory computer-readable medium of claim 47, wherein the set of classifiers are provided to a downstream computer for processing.

62. The non-transitory computer-readable medium of claim 47, wherein the collection of documents comprises text entered into a computer by a person using an input interface device.

63. The non-transitory computer-readable medium of claim 47, wherein the topic term is a company name, and wherein the particular attribute is an attribute of the company.

64. The non-transitory computer-readable medium of claim 63, wherein the particular attribute is a customer service attribute, a product attribute, a product mix attribute, a product price attribute, or a company culture attribute.

65. The non-transitory computer-readable medium of claim 47, wherein synonyms of selected classifiers are included in the set of classifiers.

66. The non-transitory computer-readable medium of claim 47, wherein the colocation matrix is stored in one or more data structures store in a computer-readable medium.

67. The non-transitory computer-readable medium of claim 47, wherein the one or more sentiment terms are identified by comparing words in topic term phrases to words in a sentiment term list.

68. The non-transitory computer-readable medium of claim 67, wherein the sentiment term list contains words that connote human feeling.

69. The non-transitory computer-readable medium of claim 67, wherein the sentiment term list includes the terms: like, love, hate, and dislike.

* * * * *